Feb. 11, 1958     E. G. GLICK     2,822,902
HOLDING MECHANISM FOR THE ACCELERATOR OF AN AUTOMOBILE
Filed Aug. 10, 1953     4 Sheets-Sheet 2
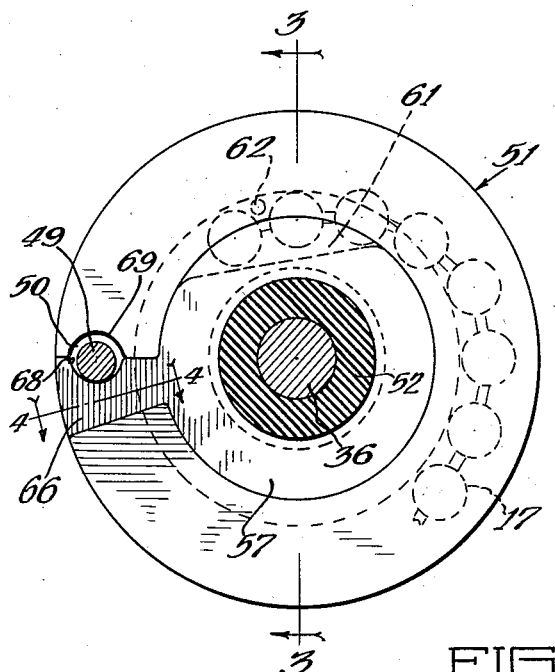
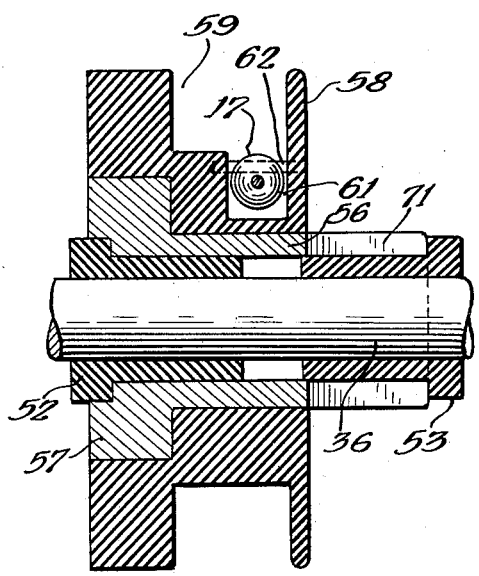
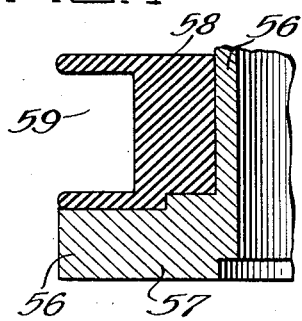
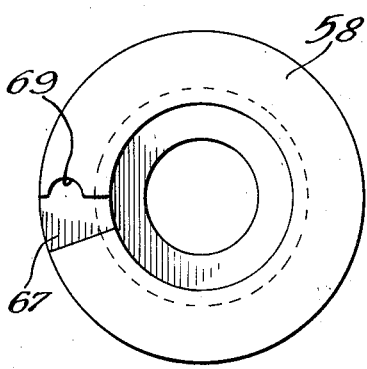
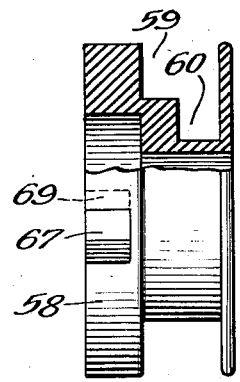
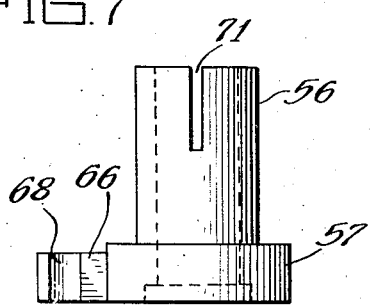
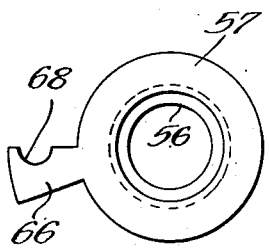
Inventor:
Edward G. Glick
By: Schroeder, Meriam,
Hofgren & Brady
Attorneys Feb. 11, 1958  E. G. GLICK  2,822,902
HOLDING MECHANISM FOR THE ACCELERATOR OF AN AUTOMOBILE
Filed Aug. 10, 1953  4 Sheets-Sheet 3

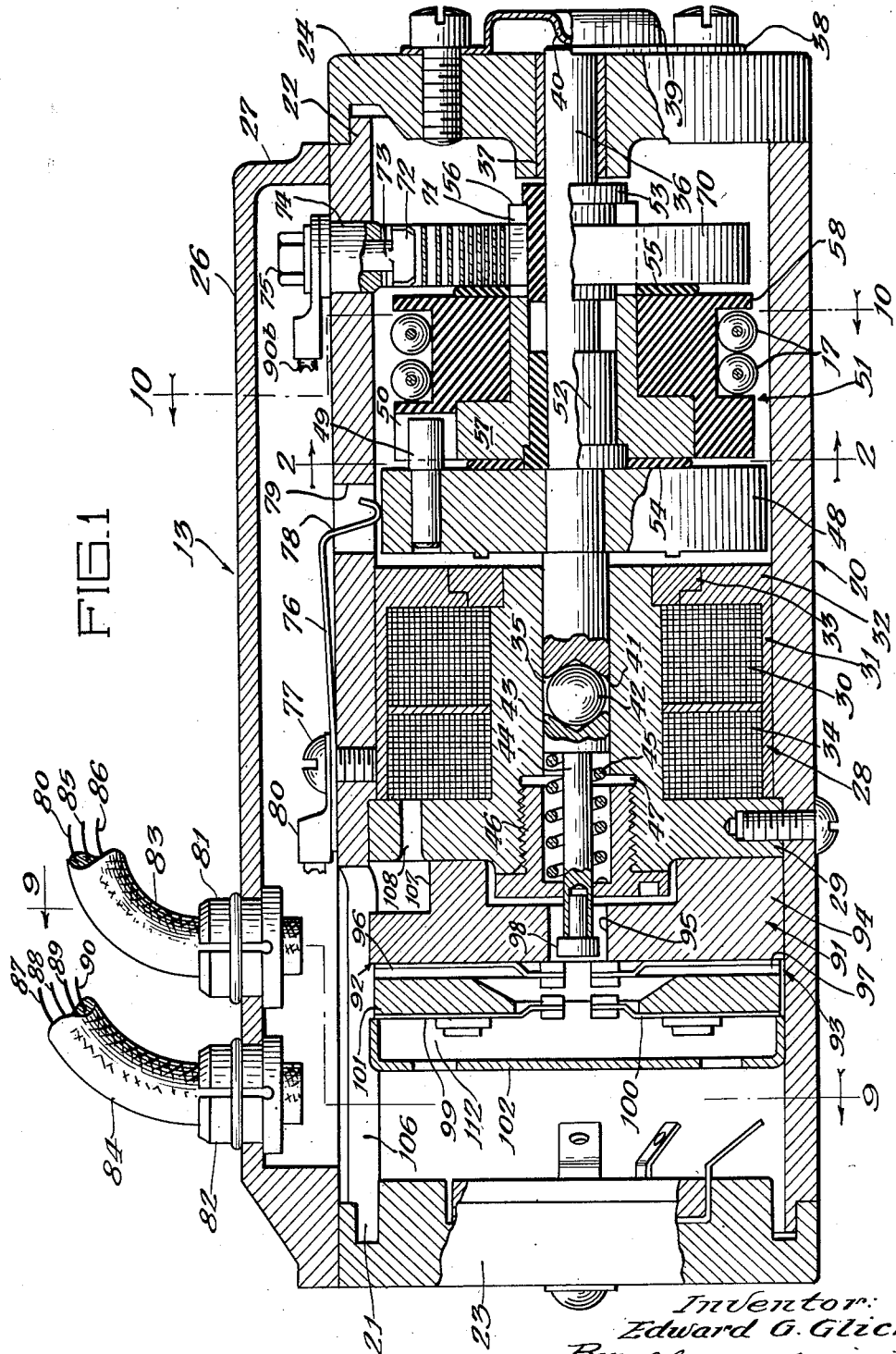

Inventor:
Edward G. Glick
By Schrader, Merriam,
Hofgren & Brady
Attorneys

Feb. 11, 1958        E. G. GLICK        2,822,902
HOLDING MECHANISM FOR THE ACCELERATOR OF AN AUTOMOBILE
Filed Aug. 10, 1953        4 Sheets-Sheet 4
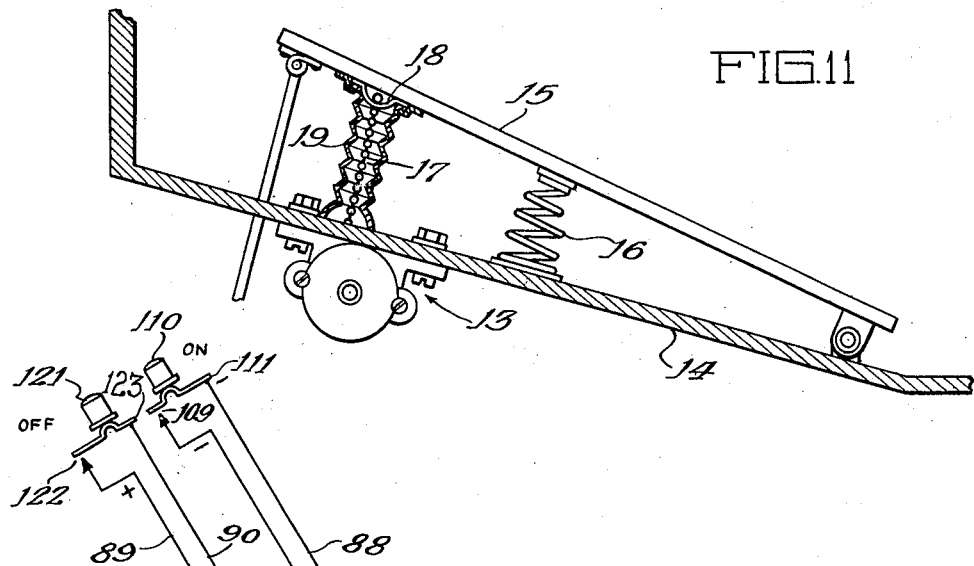
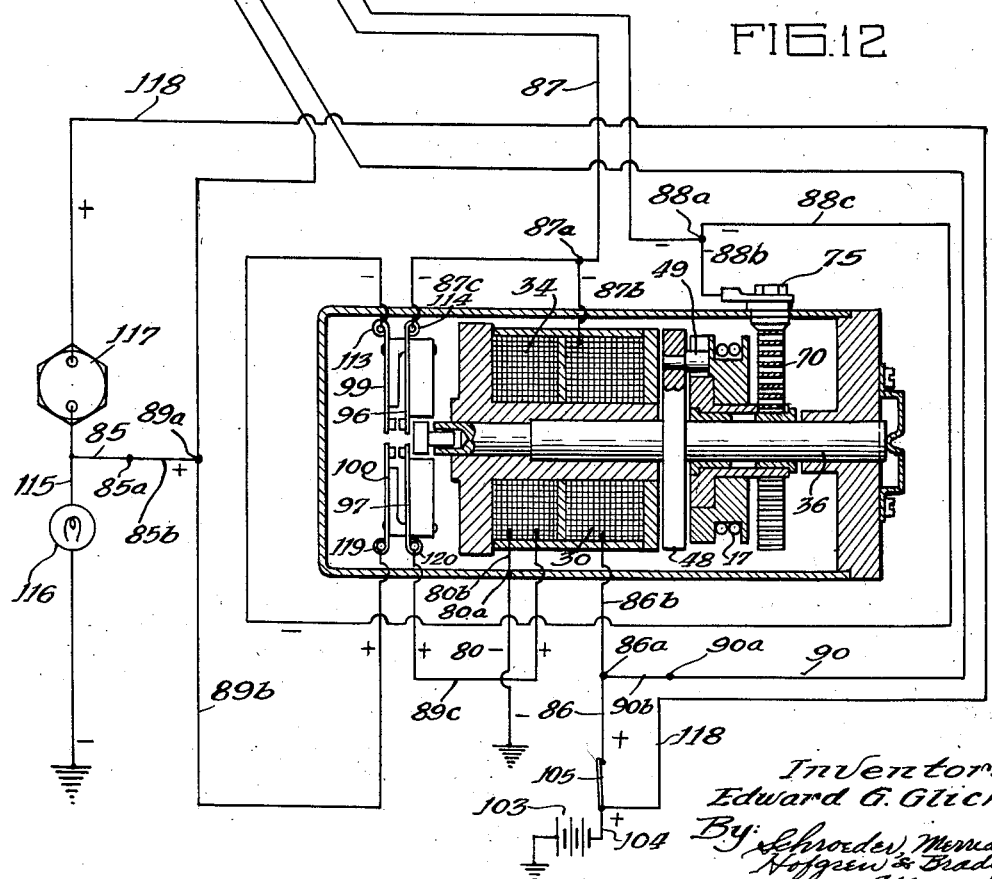
Inventor:
Edward G. Glick
By Schroeder, Merriam,
Hofgren & Brady
Attorneys United States Patent Office 2,822,902
Patented Feb. 11, 1958

2,822,902

HOLDING MECHANISM FOR THE ACCELERATOR OF AN AUTOMOBILE

Edward G. Glick, Chicago, Ill., assignor of one-half to Rembe McCormick, Chicago, Ill.

Application August 10, 1953, Serial No. 373,248

6 Claims. (Cl. 192—3)

This invention relates to an improved holding mechanism for the accelerator of an automobile.

My prior patent, 2,270,002, discloses a mechanism whereby, by a simple operation, the operator of an automobile may cause the accelerator to become set in any position to which he has actuated it for continuing the operation of the automobile at the obtained speed, thereby eliminating the necessity of holding the pedal down against the pressure of the accelerator spring. The mechanism adds considerably to the comfort of the driver, especially on long highway trips.

The holding mechanism is so constructed that it automatically releases the accelerator to the control of the operator when either the accelerator pedal or the brake pedal is depressed, or by pressing a separate manual disconnect button. Thus, the device is entirely foolproof in operation and requires no conscious thought on the part of the operator to free the accelerator for ordinary operation.

The present invention comprehends a mechanism which performs the same operations as the mechanism of my prior patent insofar as the operator of the vehicle is concerned, but the device is considerably simplified mechanically and the cost of manufacture is substantially reduced.

The principal object of the present invention, therefore, is to provide a simple and inexpensive holding mechanism for the accelerator of an automobile.

A further object is to provide such a mechanism in which the electromagnet for actuating the magnetic brake armature which holds the accelerator in any desired position may be rendered inactive, so as to release the magnetic brake, by means of a neutralizing coil which counterbalances the electric effect of the electromagnet coil sufficiently to release the brake. The unit is like a differential relay; but instead of employing two coils to give varying magnetic effect within limits, each coil is always either fully energized or inert. It is clear that the term "counterbalancing" as used herein does not necessarily mean that the two coils are equal in size; but only that the neutralizing coil counterbalances the electromagnet coil sufficiently that a spring which normally keeps the brake armature spaced from the electromagnet may overcome the "counterbalanced" force of the electromagnet to release the brake. This eliminates a separate magnetic relay switch which is otherwise necessary in order to break the circuit to the electromagnet coil.

Yet another object of the invention is to provide a mechanism in which a pair of switches which must be closed as the electromagnet is energized are operated mechanically by a plunger shaft on the armature of the magnetic brake.

Still a further object is to eliminate several small electrical contact elements which require a substantial amount of detailed assembly work in building the holding unit by using as part of the electric circuit a coil spring which is an essential mechanical element of the mechanism.

The general operation of the accelerator holding device of the present invention is as follows:

A combined rotary contact switch and reel is mounted upon an armature which extends into a center bore of an electromagnet. A chain wound on the reel is directly connected to the accelerator pedal of an automobile, and a coil torsion spring which is somewhat lighter than the vehicle accelerator spring tends to rotate the reel and rotary switch in opposition to the accelerator spring action. When the accelerator pedal is depressed by the driver the coil spring rotates the reel in order to take up the chain which is secured to the accelerator pedal. When the driver wishes to place the accelerator holding device in operation to hold the pedal in position, he may press an "on" button which momentarily closes a switch to energize the electromagnet, thus drawing the armature inwardly and magnetically locking the reel and switch member against rotation. A holding switch in the electromagnet circuit is closed by the movement of the armature as the electromagnet is energized, to permit immediate release of the "on" button. The rotary reel contains switch contacts which are in the circuit for the electromagnet, and these contacts are normally closed by the action of the accelerator spring.

As long as the reel is magnetically held against rotation, the accelerator pedal remains in the position it occupied when the holding device was put in operation. However, if the operator of the vehicle steps on the accelerator, the coil spring produces relative rotation between the reel and the armature, thus opening the switch in the reel and breaking the circuit to the electromagnet. This releases the armature, which is returned to a normal position by a longitudinal coil compression spring, and also breaks the circuit at the holding switch.

It is to be noted that the coil torsion spring is a part of the electric circuit into the rotary reel and switch, thus eliminating the need for any sliding electric contacts to carry current into the rotary member.

The rotary reel and switch mechanism serves as a mechanical means for breaking the circuit to the electromagnet and stopping operation of the holding device. There is also an electrical mechanism including a neutralizing coil to neutralize the electromagnet coil and free the accelerator pedal for operation. This may be energized either by manually depressing an "off" button or by stepping on the brake to close the vehicle stop light circuit. The use of a neutralizing coil eliminates the need for a magnetic relay switch to deenergize the magnet coil.

In order to avoid any feed back of current from the neutralizing coil when the electromagnet is not in operation, the device is also provided with a normally open cut-off switch which is in the circuit for energizing the neutralizing coil from the stop light switch. This cut-off switch, like the holding switch for the electromgnet circuit, is closed by the longitudinal motion of the armature as the electromagnet is energized to start the holding device. Thus, the neutralizing coil is energized by closing the stop light switch only when the electromagnet is energized and the holding device is in operation.

The invention is illustrated in a preferred embodiment in the accompanying drawings in which:

Fig. 1 is a longitudinal center section of a holding mechanism constructed in accordance with the invention, certain parts being shown in elevation;

Fig. 2 is a section on an enlarged scale taken as indicated along the line 2—2 of Fig. 1;

Fig. 3 is a fragmentary section taken as indicated along the line 3—3 of Fig. 2;

Fig. 4 is a fragmentary section taken as indicated along the line 4—4 of Fig. 2;

Fig. 5 is a front elevation on a smaller scale than Fig. 2 of the dielectric hub for the accelerator actuated cutoff switch;

Fig. 6 is a side elevation, partly in section, of the dielectric hub for the accelerator cutoff switch;

Fig. 7 is a side elevation of the electric contact insert for the accelerator cutoff switch;

Fig. 8 is a front elevation of said electric contact insert;

Fig. 11 is a view on a reduced scale showing the positioning of the speed setting unit and its connection to the accelerator pedal; and Fig. 12 is a wiring diagram.

Figure 9:
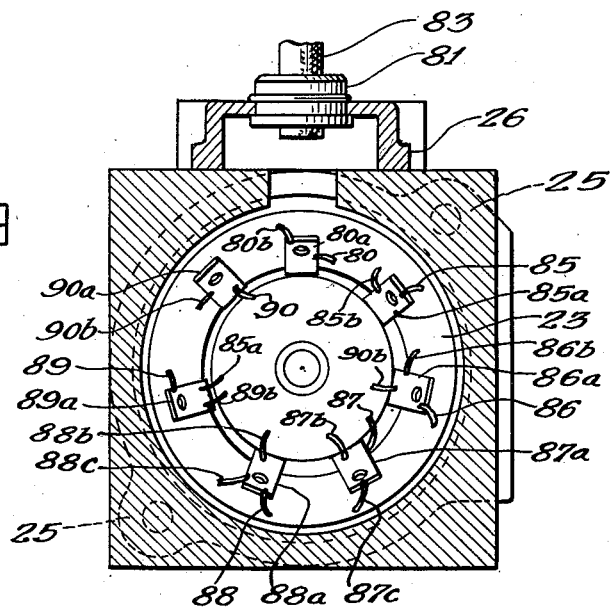
Fig. 9 is a section taken as indicated along the line 9—9 of Fig. 1.

Referring to the drawings in greater detail, and referring first to Fig. 11, a holding device, indicated generally at 13, is secured to the floor boards 14 of an automobile directly beneath the pivoted accelerator pedal 15 which is urged to idling position by an accelerator spring 16. A ball-type chain 17 is secured to an eye 18 on the underside of the accelerator pedal and extends downwardly through a bellows-type casing 19, through the floor boards and into the holding device 13 where it winds upon a reel as will be more fully described.

Referring now to Fig. 1, a rectangular metal body, preferably brass, indicated generally at 20, has annular end flanges 21 and 22 to receive hard fiber end caps 23 and 24, respectively; and as seen in Fig. 9 is provided with bosses 25 to which the end cap 23 is screwed. Similar bosses, not shown, are provided adjacent the annular end flange 22 to receive fastening screws for the end cap 24. A generally rectangular dielectric top cap 26 has a peripheral depending skirt 27 by means of which it may be secured to the top of the metal body member 20.

An electromagnet, indicated generally at 28, has a soft iron core 29 fastened within the body 20 and a coil 30 wound around said core in the customary fashion. A soft iron magnet shell 31 surrounds the coil 30. The magnet shell 31 has its end wall 32 recessed to receive an annular nonmagnetic stop member 33. Also wound on the magnet core 29 is a neutralizing coil 34 which, for convenience of illustration, is shown as being positioned adjacent one end of the electromagnet coil 30. It is obvious, however, that in practice the electromagnet coil 30 and the neutralizing coil 34 would normally consist of two electric windings laid side by side and simultaneously wound, so that the layers of the neutralizing coil 34 and the layers of the electromagnetic coil 30 would be interspersed. The neutralizing effect of the coil 34 in such a construction is achieved by reversing the electric connections to the coils so that current flows in opposite directions in them. The precise manner in which the electromagnetic coil 30 and the neutralizing coil 34 are wound is immaterial so long as they produce opposite electrical effects upon the soft iron core 29 and electromagnet shell 31 so that when both coils are energized the core and shell are not magnetized.

The core 29 of the electromagnet has a center bore 35 to slidably and rotatably receive an armature shaft 36, the opposite end of which is supported in a bushing 37 in the fiber end cap 24. A stamped metal end plate 38 is screwed to the end cap 24 and has a central boss 39 in which is a concavity 40 to limit sliding movement of the armature shaft 36 in one direction. The armature shaft 36 is recessed at its inner end as indicated at 41 to accommodate a ball bearing 42. On the opposite side of the ball bearing 42 is a slidable recessed plug 43 having an axial plunger finger 44 about which is wound a compression spring 45, which is calibrated so as to give the desired thrust on the armature shaft. A threaded adjusting nipple 46 screws into a counterbore 47 in the magnet core 29 to retain the spring 45 in the bore 35 and also provide means for correcting minor irregularities in spring calibration within normal manufacturing tolerances. Thus, the armature shaft 36 is yieldably urged toward the end plate 38, so that an armature 48 keyed on the shaft 36 is normally spaced from the magnet face. Adjacent the periphery of the armature 48 is a metal contact pin 49 which extends into an opening 50 in one face of a combined rotary contact switch and reel, indicated generally at 51.

Figure 10:
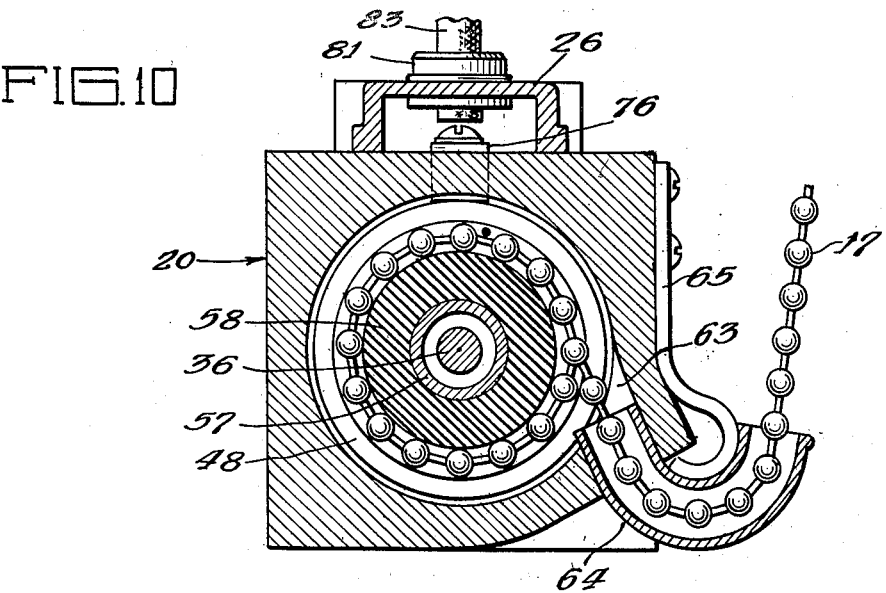
Fig. 10 is a section taken as indicated along the line 10—10 of Fig. 1.

The combined rotary contact switch and reel, shown in detail in Figs. 2 to 8, is mounted on a pair of insulating bushings 52 and 53 on the armature shaft 36 and is flanked by fiber insulator washers 54 and 55. The rotary contact and reel 51 has a metallic contact sleeve 56 which is mounted on the insulating bushings 52 and 53 and has an annular flange 57 at its forward end which abuts against the fiber insulator washer 54; and a hard plastic reel hub 58 fits over the sleeve 56 and butts against the annular flange 57 of said sleeve. The hub 58 has a circumferential chain channel 59 through which the ball-type chain 17, which is secured to the accelerator pedal, enters the casing 20. The end of the chain 17 is held in a groove 61 in the channel 59 by means of a pin 62. As seen in Fig. 10, the body 20 has a downwardly extending diagonal channel 63 aligned with the reel and a small U-tube 64 which is secured to the body 20 by a bracket 65 communicates with the channel 63 so that the chain 17 may have its free end pass out of the body 20 through the U-tube 64.

As best seen in Figs. 5 to 8, the flange 57 on the metal sleeve 56 has a laterally extending contact finger 66 which seats in an opening 67 in the face of the plastic hub 58, and the metal contact finger 66 and recess 67 are provided with complementary grooves 68 and 69, respectively, which define the margins of the opening 50 for the projecting pin 49 on the armature 48. As seen in Fig. 2 the opening 50 is slightly larger in diameter than the pin 49, so as to provide a lost motion connection between the unit 51 and the armature 48. The gap between the pin and the wall of the groove 69 is about .012 inch; and the pin 49 and rotary switch and hub unit 51 may serve as elements of an electric circuit which is closed when the pin is against the wall of the groove 68 in the metal contact finger 66 and which is open when it is against the wall of the groove 69 in the plastic hub 58.

The rotary contact and hub member 51 is urged counterclockwise as viewed in Fig. 2 by means of a coil spring 70 which surrounds the rear of the sleeve 56 and has its inner end held in a slot 71 in said sleeve. The outer end of the spring 70 is secured in a spring clip 72 on a threaded pin 73 which extends through an insulating bushing 74 in the top wall of the body 20 and is secured in place by a nut 75 so that the spring 70 may serve as an element of the electric circuit which includes the pin 49 and the contact finger 66 of the combined rotary switch and hub 51. The accelerator spring 16 is somewhat stronger than the coil spring 70 so that when there is no outside force acting upon the accelerator pedal the pin 49 rests against the metal contact finger 66 and provides a closed circuit through the rotary switch. When the operator of the vehicle depresses the accelerator pedal, taking the counterbalancing tension of the accelerator spring off the ball chain 17, the reel and hub member 51 is rotated counterclockwise by the tension of the coil spring 70 so as to move the rotary contact with respect to the pin 49 and leave a gap between the pin and the metal contact finger 66. To assure that friction between the fiber insulator washer 54 and the armature 48 does not prevent the necessary relative movement between the rotary switch and reel member 51 and the armature 48, a friction spring arm 76 (see Fig. 1) is secured to the casing 20 by means of a machine screw 77 and has its outer end portion 78 extending through an aperture 79 in the casing and bearing upon the armature 48 to assure a lag between the movement of the member 51 and that of the armature. The screw 77 also serves as a terminal for a ground wire 80 by means of which the metal casing 20 is permanently grounded.

The rectangular dielectric top cap 26 has a pair of split fittings 81 and 82 for electric conductor cables 83 and 84, respectively, through which all the electric circuit wires, including the ground wire 80, pass out of the casing 20 and cap 26. In addition to the ground wire 80, the cable 83 carries a wire 85 to the stop light switch and a wire 86 to the ignition switch; and the cable 84 carries wires 87 and 88 which are part of the circuit for initiating operation of the holding device, and wires 89 and 90 which are part of a circuit for deactivating the holding device manually.

As best seen in Fig. 9 the fiber end cap 23 is provided with seven electric contact terminals, numbered 80a, 85a, 86a, 87a, 88a, 89a and 90a, to which the correspondingly numbered wires from the cables 83 and 84 are soldered, and from said electric contact terminals the various control circuit wires extend to the various necessary connections within the casing as will be described in connection with the control circuit.

Mounted between the electromagnet core 29 and the end cap 23 is a mechanical switch assembly, indicated generally at 91, which includes a holding switch, indicated generally at 92, and a neutralizing circuit cutoff switch, indicated generally at 93. The mechanical switch assembly 91 comprises a fiber mounting member 94 having a central orifice 95 into which extends the axial plunger finger 44 in the bore 35 of the electromagnet core 29. Secured to the upper portion of the mounting member 94 is a spring contact 96 for the holding switch 92, and secured to the bottom of the mounting member 94 is a spring contact 97 for the cutoff switch 93, the inner ends of said spring contacts 96 and 97 extending partly across the orifice 95 so that they may be moved to the left as seen in Fig. 1 by a pusher cap 98 on the end of the plunger finger 44 when the armature 48 is drawn toward the electromagnet 28. When this occurs the spring contact 96 closes against a fixed contact 99 and the spring contact 97 closes against a fixed contact 100, both of which are mounted upon an annular fiber base plate 101. A fiber cap 102 completes the mechanical switch assembly 91.

It is clear from the foregoing description that energization of the coil 30 for the electromagnet 28 will draw the armature 48 against the nonmagnetic annulus 33 and lock the magnetic brake which is formed by the armature 48 and the combined reel and switch member 51 against rotation. When this takes place, the accelerator 15 is held in place against the tension of the accelerator spring 16 by reason of the ball chain 17 which is wound around the reel 58 and has its upper end secured to the accelerator pedal 15. Longitudinal movement of the armature shaft 36 acting through the plunger finger 44 closes the holding switch 92 and cutoff switch 93. The circuit through the coil spring 70 and pin 49, which is grounded through the casing 20 may be broken by movement of the rotary switch and reel member 51 whenever the operator of the vehicle next depresses the accelerator, releasing the accelerator pedal 15 to the control of the operator. The electromagnet may also be rendered inactive either by stepping on the brake or by voluntarily closing a switch, as will now be described in connection with the wiring diagram Fig. 12.

From an automobile battery 203 a line 104 connects with an ignition switch 105, from which the positive lead 86 connects with the electric terminal 86a through the cable 83, and through a line 86b is permanently connected to the electromagnet coil 30. Referring to Fig. 1, the lead 86b actually extends through a slot 106 in the top of the casing 20, a channel 107 in the inner face of the fiber mounting member 94, and an aperture 108 in the electromagnet core 29. The remaining contacts for the electromagnet coil 30 are all on the negative side of the circuit.

From the electromagnet coil 30 a negative lead 87b extends to the terminal 87a by means of which it is connected to the line 87, the latter line passing out of the casing through the cable 84 and being attached to one contact 109 of a push button switch 110, the other contact 111 of the push button switch being connected through the line 88 to the contact 88a and thence by way of a wire 88b to the terminal post 75 for the coil spring 70. Like all leads from the electromagnet coil 30 and the neutralizing coil 34, the lead 87b passes through the opening 108 in the magnet core 29. From the contact 88a a holding circuit wire 88c extends through an aperture 112 in the fiber cap 102 and is secured to a terminal 113 on the fixed contact 99 of the holding switch 92; and from a connection 114 on the movable contact 96 of the holding switch 92 a line 87c extends to the electric terminal 87a. Since the casing is permanently grounded through the line 80, when the ignition switch 104 is closed depressing the push button switch 110 closes a circuit through the line 87, the contact 87a and the line 87b to the coil 30; and through the line 88, the contact 88a, the lead 88b, the coil spring 70, the metal contact finger 66, the pin 49 and the ground 80. This energizes the coil 30 which draws the armature 48 toward the electromagnet, setting the magnet brake so as to hold the combined rotary switch and reel member 51 against the tension of the accelerator spring and thus prevent movement of the accelerator 15 toward idling position. Movement of the armature 48 and armature shaft 36, acting through the plunger finger 44 closes the holding switch 92 and also the cutoff switch 93. With the holding switch 92 closed, there is also a closed circuit through the lead 87b to the electric connection 87a, through the line 87c to the holding switch; and from the holding switch through the line 88c, and the electric terminal 88a to the line 88b. Thus, when the operator removes his finger from the push button 110 the coil 30 remains energized through the circuit including the holding switch 92.

The circuits for energizing the neutralizing coil 34, which is wired into a positive circuit and permanently grounded by means of a connection 80b to the electric terminal 80a for the ground line 80, will now be described. The wire 85 which passes out of the casing cap 26 through the cable 83 is connected to a circuit 115 for the stop light 116 of the automobile, so that the compression switch 117 by means of which the stop light is actuated when the brake is applied is a part of the circuit. The positive side of the stop light switch is connected through a wire 118 to the main battery lead 104 ahead of the ignition switch 105, so that the stop light operates in the customary manner whether or not the ignition switch is closed. Inside the casing 20 the wire 85 from the stop light circuit connects with the electric terminal 85a, and from said terminal a lead 85b connects to the terminal 98a. From the terminal 89a a line 89b goes to a connector 119 on the fixed contact 100 of the cutoff switch 93. From a connector 120 for the spring contact 97 of said switch a wire 89c extends through the opening 108 in the electromagnet core 29 and connects to the neutralizing coil 34. Thus, if the electromagnet coil 30 is energized so that the magnetic brake is locked, at which time the cutoff switch 93 is closed by the pressure of the plunger finger 44, the neutralizing coil may be energized by stepping on the brake which closes the stop light switch. The circuit is from the battery through the lines 104 and 118, through the stop light switch 117, through the line 85, the electric terminal 85a, the connection 85b, the electric terminal 89a, the wire 89b, the cutoff switch 93 and the wire 89c, the return to ground being by means of the wire 80b to the electric terminal 80a and thus to the ground wire 80. When the neutralizing coil 84 thus energized it counterbalances the electric effect of the electromagnet coil 30 sufficiently to permit the spring 45 to disengage the armature 48 from the grip of the electromagnet 28, thus freeing the accelerator pedal 15 for control by the operator. The cutoff switch 93 prevents the neutralizing coil from being energized when the holding device is not operating so that there is no feed-back into the stop light circuit when the brake is applied.

Alternatively, the operator may consciously render the holding device 13 inoperative by pressing an off push button switch 121 which has one contact 122 connected through the wire 89 with the electric terminal 89a and which has its other contact 123 connected by means of the wire 90 with the terminal 90a in the casing and through a wire 90b to the electric terminal 86a which in turn is connected by the wire 86 with the ignition switch 105. Thus, pushing the off button 121 closes a circuit from the ignition switch 105 through the line 86, the terminal 86a, the lead 90b, the terminal 90a, the wire 90, the push button switch 121, the wire 89, the electric terminal 89a, the wire 89b, the cutoff switch 93 and the wire 89c to the neutralizing coil 34. The "on" push button 110 and the "off" push button 121 may be located in any convenient place, such as the steering wheel post, or the dashboard.

The wire diagram Fig. 12 includes all the internal electric terminals which are mounted in the end cap 23 of the casing 20, and for clarity of illustration the electric terminals are shown in the circuits outside the casing. It is to be understood, however, that the elements 80a and 85a to 90a, inclusive, in the wiring diagram Fig. 12 are the same elements as those in the section Fig. 9. It will be observed from Figs. 1 and 9 and the wiring diagram Fig. 12 that the only wires which pass out of the casing are the wires carried in the cables 83 and 84, and that all necessary connections between any such wires are accomplished by appropriate leads between the various electric terminals in the end cap 23. Thus, there are very few external connections to be made in installing the holding device—i. e., one to the stop light switch, one to the ignition switch, and one to ground. The push buttons 110 and 121 are a part of the holding device, and need not be connected with any outside circuit wires of the automobile except through the various electric terminals in the end cap 23.

The foregoing detailed description is given for clearness of understanding only and no unnecessary limitations are to be understood therefrom, as some modifications will be obvious to those skilled in the art.

I claim:

1. Holding mechanism for an automobile accelerator mechanism which includes a pedal and an accelerator spring normally urging said pedal toward idling position, comprising: first electric means for holding said accelerator pedal against the urging of said accelerator spring in any position to which it is actuated by the operator of the automobile, said first electric means being normally inactive in the movement of the accelerator; controllable means for rendering the first electric means active to hold the accelerator; counterbalancing electric means activatable to electrically neutralize said first electric means, thereby freeing the accelerator pedal from the first electric means for normal movement by said accelerator spring; and means under the control of the operator of the automobile for activating said counterbalancing electric means.

2. The device of claim 1 in which the means under the control of the operator includes an electric circuit wired through the stop light switch and a normally open switch in said circuit which is closed upon activation of the first electric means so that the stop light switch is in electric communication with said counterbalancing electric means only when the first electric means is active.

3. Holding mechanism for the accelerator of an automobile accelerator mechanism which includes a pedal and an accelerator spring normally urging said pedal toward idling position, comprising: first electric means for holding said accelerator pedal against the urging of said accelerator spring in any given position to which it is actuated by the operator of the automobile, said means being normally inactive in the movement of the accelerator; electric circuit means for activating the first electric means to hold the accelerator, said electric circuit means including a switch which is normally closed by the force of the accelerator spring and which may be opened by depressing the accelerator, a finger switch for initially activating said first electric means, and a holding switch which is closed upon activation of the first electric means; counterbalancing electric means activatable to electrically neutralize the first electric means, thereby freeing the accelerator pedal from the first electric means for normal movement by the accelerator spring; and circuit means under the control of the operator for energizing said counterbalancing electric means.

4. The device of claim 3 in which the circuit means under the control of the operator includes the stop light switch and a normally open switch which is closed upon activation of the first electric means so that the stop light switch is in electric communication with said counterbalancing electric means only when the first electric means is active.

5. Holding mechanism for an automobile accelerator mechanism which includes a pedal and an acelcrator spring normally urging said pedal toward idling position, comprising: relatively movable cooperating electric contacts, said contacts having an open position and a closed position; mechanical means linking one of said contacts with the accelerator pedal so that the accelerator spring tends to move said contacts to closed position; spring means which is weaker than the accelerator spring connected to said contact tending to move it to open position; electric means for maintaining said contacts in closed position; electric circuit means through said contacts and said spring means for energizing said electric means, said circuit means including a first circuit with a normally open manual switch and a holding circuit which is closed upon energization of said electric means; and electromechanical means under the control of the operator of the automobile for rendering said electric means ineffective so as to release said contacts for movement.

6. Holding mechanism for an automobile accelerator mechanism which includes a pedal and an accelerator spring normally urging said pedal toward idling position, comprising: an electromagnet; rotatable brake means adapted to be locked against rotation by energization of said electromagnet, said brake means including two rotatable members with a lost motion connection which forms an electric switch, one of said members being of magnetic material and slidable toward said electromagnet, thereby to be locked against rotation; an electric circuit for energizing the electromagnet through said electric switch; spring means acting on the other rotatable member to urge the switch to closed position; a finger switch in said circuit for initially energizing said electromagnet; a holding circuit for the electromagnet; neutralizing electric means for rendering said electromagnet ineffective; an energizing circuit provided with switch means for activating said neutralizing electric means; and normally open switches in the holding circuit and in the energizing circuit both of which are closed through longitudinal movement of said magnetic member whereby said holding circuit is closed upon energization of the electromagnet and said energizing circuit is in electric communication with the neutralizing electric means only when the electromagnet is active.

References Cited in the file of this patent

UNITED STATES PATENTS

| | | | |
|---|---|---|---|
| 1,007,480 | North et al. | Oct. 31, | 1911 |
| 1,434,637 | Tuck | Nov. 7, | 1922 |
| 1,820,272 | Gumpper | Aug. 25, | 1931 |
| 1,980,796 | Goff | Nov. 13, | 1934 |
| 2,270,002 | Glick | Jan. 13, | 1942 |
| 2,658,591 | Medlar et al. | Nov. 10, | 1953 |
| 2,742,123 | Exline | Apr. 17, | 1956 |